United States Patent

Dmitriev et al.

Patent Number: 5,774,587
Date of Patent: Jun. 30, 1998

[54] METHOD OF OBJECTS RECOGNITION

[76] Inventors: Alexander Dmitriev, Krilatskie holmist., 1, ap. 343, 121609, Moscow; Yury Andaeev, Neftjuikov st., 1, ap 26, 141700p10 Paveltsevo, Moscow Reg.; Yury Belsky, Suoboda St., 81/2, ap. 370, 123981 Moscow; Dmitry Kuminov, Kezchenskaya St., 1a/2, ap. 601, 113303, Moscow; Andzei Panas, Vokzalnaya St., 17, ap. 24, 141120 Fzyazino; Sergai Starkov, Engels St., 2, ap. 166, 249020 Olninsk, all of Russian Federation

[21] Appl. No.: 556,938
[22] PCT Filed: Mar. 3, 1994
[86] PCT No.: PCT/RU94/00044
§ 371 Date: Dec. 1, 1995
§ 102(e) Date: Dec. 1, 1995
[87] PCT Pub. No.: WO95/24015
PCT Pub. Date: Sep. 8, 1995
[51] Int. Cl.[6] .............. G06K 9/72; G06K 9/46; G10L 5/06
[52] U.S. Cl. .......... 382/229; 382/190; 395/2.6; 395/2.63
[58] Field of Search .............. 382/229, 190, 382/158, 181; 395/10, 20, 2.4, 2.6, 2.63

[56] References Cited

U.S. PATENT DOCUMENTS

| 4,348,553 | 9/1982 | Baker et al. | 395/2.65 |
| 4,955,056 | 9/1990 | Stentiford | 395/2.48 |
| 5,179,542 | 1/1993 | Reese et al. | 367/135 |
| 5,287,275 | 2/1994 | Kimura | 382/190 |
| 5,446,828 | 8/1995 | Woodall | 395/23 |

Primary Examiner—David K. Moore
Assistant Examiner—Wenpeng Chen
Attorney, Agent, or Firm—Notaro & Michalos P.C.

[57] ABSTRACT

Recognition of various images uses, a presentation of reference (standard) objects transformed into corresponding discretized reference signals without repeating quantization levels. For a set of these signals, a dynamical system is formed of the kind of iterable mapping of d-dimensional cube into itself with limit cycles by the number of reference signals. Representations of an object under identification are transformed into information signals that are applied to the input of the dynamical system as initial conditions and by the results of its functioning a decision is made on recognition of the object under identification. Distinctive features of the method are the conditions of looking through the values of information at the input of the dynamical system and the conditions of determining the correspondence of the information signal to one of the reference signals by the phase trajectory of the dynamical system getting to one of the limit cycles in the process of its functioning.

13 Claims, 10 Drawing Sheets

METHOD OF OBJECTS RECOGNITION

The present invention relates to methods of recognition of various objects, for example graphic images, texts, oral reports, radar signals, etc.

BACKGROUND TO THE INVENTION

The problem of recognizing an object is solved in general by means of comparing this object or a part thereof to certain predetermined reference sample. To facilitate this comparison, the object under recognition and reference sample may be replaced with their representations, for example in the from of code signals.

Evident examples of the recognition of objects are the selection of an appropriate element in a puzzle for children in order to arrange the necessary pattern, or the identification of a well-known melody by a small part thereof. But such tasks have no structure which can be reduced to simple algorithmic solutions.

One of the possible ways to carry out the problem of recognition is to break down the object to its components (dots of all image, frequency harmonics of a vocal signal) and to compare the set of these components with reference sets of similar elements. But technical and time limitations, e.g. a large volume of equipment (memory) in the case of a parallel comparison to many references, or a long time necessary for such comparison in the case of the subsequent comparing with references, do not make it possible to use such a method for the recognition of complicated objects.

Usually "element by element" comparison of the object is replaced by the comparison only of its most characteristic features: predetermined pattern on a drawing, the of eyes on a portrait, the sets phonemes of a vocal signal (See U.S. Pat. No. 5,016,282, Cl. G 06 K 9/900, published in 1991; U.S. Pat. No. 5,195,166, Cl. G 10 L 9/00, published on 16.03.93). But if such distinctive features are absent in the part of the object to be subjected to recognition, there will be no recognition even if this part of the object is the part of a reference object.

Another method to replace this "element by element" comparison is the selection of certain primitive elements which if combined make it possible to represent any reference object (for example, combination of seven basic strokes and their modifications in Chinese hieroglyphs). In this case recognition of the objects reduces to identification of primitive elements in these objects and to the definition of their combination (international application WO 89/05494 Cl. G 06 K 9/22, 9/78, published in 1989). This method is intended for the recognition of the characters in texts and cannot be used for other objects. In addition the presence of various different combinations, consisting of a limited amount of primitive elements is hardly more simple than the method of the "element by element" recognition.

In U.S. Pat. No. 5,133,021 Cl. G 06 K 9/00, published in 1992 another possible recognition method based on the theory of adaptive resonance is described. According to this method an input signal which can be represented either as a dimensional or as time sample is passed though an adaptive filter and chooses one of the patterns. Then the deviation between the input signal and the chosen pattern is defined. If this deviation is larger than the predetermined one of the chosen pattern is rejected, and otherwise—this deviation is being adapted to the maximum possible extent to the input signal. The necessity of such an adaptation may be the source of errors in the case of a small number of patterns.

The above mentioned drawbacks can be avoided if the method of associative recognition based on the use of one-dimensional non-linear dynamic systems of a type of mapping of a segment into itself is used (Yu. V. Andreev, A. S. Dmitriev, S. O. Starkov. Images Processing on the basis of one-dimensional dynamic systems. Software Complex "Informchaos". Preprint N.2 (584). Institute of Radioengineering & Electronics RAS, Moscow, 1993 pg. 4–36). The above mentioned dynamic system is formed in such a way that it contains various limit cycles each corresponding to one of the references. If such a dynamic system, in the case a certain fragment is fed to its input, functions in such a way that its phase trajectory fits into one of these limit cycles, then the fragment being fed in shall be recognized as a part of the reference corresponding to this cycle. The above mentioned method could be used as a demonstration one to recognize fragments of relatively simple objects.

SUMMARY OF THE INVENTION

The present invention makes it possible to provide recognition of an arbitrary object of any degree of complexity.

In order to provide a better understanding of the present invention the list of definitions and terms used in the description of the invention is given below.

Dynamic System is the complex of hardware and/or software that has been formed in accordance with a certain system of evolution equations given in an evident form or by a graphic representation.

Mapping of a segment into itself is an one-valued transformation of coordinates of a certain segment in accordance with a given function when the value of this function, calculated for the given step is an argument of the same function at the next step of the calculations.

Mapping of d-dimensional cube into itself is a transformation similar to the mapping of a segment into itself carried out in d-dimensional (d>1) space (when d=1 then d-dimensional cube is reduced to a segment).

Phase space of the mapping of d-dimensional cube into itself is a d-dimensional space, the points of which characterize the state of the dynamic system.

Phase trajectory is a graphic mapping of the process of functioning of a dynamic system.

Limit Cycle (stable or unstable) is a phase trajectory iteratively repeated in the process of functioning of a dynamic system.

Step-by-step iteration is the transformation of any of the concrete values of variables fed to the input of the dynamic system in accordance with a predetermined function (system of functions) at a separate step of calculation.

Predetermined degree of approximation is a predetermined accuracy or the degree of similarity of a real dynamic system (of the process of functioning of the dynamic system) to its mathematical representation, a model.

Predetermined degree of similarity is a predetermined degree of similarity between sequences of samples (for example, admissible number of omissions of samples in one of the sequences with respect to the other, or a relative alteration of the values of samples in comparison with the values of the same samples of other sequences).

Information Parameter is a concrete characteristic of the signal (amplitude, phase, duration, etc.) used for the registration and/or transmission of a qualitative or quantitative value of any feature.

Quantization Level is a discrete value of an information parameter to which any value of an information parameter lying within a certain range near this quantization level is set in correspondence to, for example from a given quantization level till the next one (i.e. within the limits of a quantization step), or being bigger or less than the given level within the limits of a half of the quantization step.

Condition of Validity is the minimum amount of samples in a sequence (fragment) ensuring correct recognition of any object in accordance with its fragment.

In accordance with this invention the method of recognition of objects includes the following sequence of operations:

transformation of representation of "K" (K≧1) reference objects into corresponding reference signals time sampled with a predetermined time step $\Delta t$ and quantized into an information parameter along the whole range of its variation "L" at "N" levels, the number of which has been selected in such a way that each of N quatization levels can be found in the set of all K reference signals not more than once;

formation, for the set of all K reference signals, of such a dynamic system which can be described with not less than predetermined degree of approximation by the mapping of d-dimensional (d≧1) cube into itself, being time iterated with predetermined step $\tau$ and which comprises K limit cycles each corresponding to one of K reference signals;

transformation of representation of the recognized or its part into samples $I_S$ (S=1, 2, . . . M; (M<N) of information signal sampled with the time step $\Delta t$ and quantized in information parameter in the range L according to said N levels;

samples $I_S$, . . . $I_{S+B}$ (B=0, 1, . . . ; where M−S−2B>R, where R>1 is defined by the condition of reliability) of the information signal are fed to the input of an already formed dynamic system as the initial conditions of its functioning;

the decision on recognition of the identified object under recognition or its part in accordance with the result of the functioning of the dynamic system, so that:

after feeding samples $I_S$, . . . $I_{S+B}$ of the informational signal to the input of the dynamic system its functioning is started up;

in the case the phase of the dynamic system trajectory in the process of its functioning does not reach any of K limit cycles the samples $I_{S+B+1}$, . . . $I_{S+2B}$ of the information signals are applied to the input of the dynamic system as initial conditions of its functioning, and the functioning of the dynamic system is started up again;

in the case the phase trajectory of the dynamic system in the process of its functioning reaches one of its K limit cycles the reference signal corresponding to this limit cycle shall be compared to the information signal;

decision on recognition of the identified object shall be made in the case of coincidence with a degree of similarity not less than the predetermined one of the information signal with the said reference signal;

reference signal coinciding with the information signal with the degree of similarity not less than the predetermined one is then indicated;

in the case of coincidence of the said reference signal with the information signal with the degree of coincidence less than the predetermined one, or in the case the phase trajectory of the dynamic system does not reach any of K limit cycles when a subsequent feeding to its input of B samples from the amount of M−R first samples of information signal is carried out the decision is made to deny recognition.

According to this method the dynamic system is being formed for the case d=1 in such a manner that in its graphic representation:

the set of all N quantization levels shall be identically mapped on axes of abscissa X and ordinate Y within the range of (0<X<L), (0<Y<L);

for each reference signal in the obtained coordinates the points shall be plotted so that an abscissa X of each point is equal to the value of corresponding sample of the reference signal, and an ordinate Y of each point shall be equal to the value of the next sample of the same reference signal;

through each "r" plotted point (r=1, 2, . . . N'; N'<N) the r-th informative line segment shall be drawn, being a single-value function $f_r$ of argument X related to the abscissa, so that for each r-th plotted point the value of the first derivative $f'_r$ of the said function $f_r$ corresponding to this point is such that the product of all these values is equal to the predetermined value;

the neighboring along an abscissa ends of the drawn r-th and (r+1)-th informative segments shall be connected with connecting line, being a single-value function $f_t$ of argument X related to the abscissa, and from the beginning of the first (r=1) and the end of the last (r=N') informative line similar connecting lines shall be drawn correspondingly to the beginning of coordinates and to the point L at the abscissa.

In this case informative line segments of lines through each r-th plotted point shall be drawn in such a manner that the product of all values of the first derivatives of $f'_r$ shall be more that one by amplitude.

According to another variant of the method the informative line segments through each r-th plotted point shall be drawn in such a manner that the product of all values of the first derivatives of shall be less that one.

In this case line segments through each r-th plotted point shall be drawn in such a manner that the value of the first derivative $f'_r$ of function corresponding to the drawn line at the plotted point shall be less that one.

In addition each connecting line, with the value of the first derivative $f_r$, at least in one point less than one shall be replaced with two lines connecting the ends of the connecting line being replaced with the projection of its predetermined point at the abscissa.

In the case when the product of all values of the first derivatives of $f'_r$ is greater than one, in the process of the functioning of dynamic system:

after feeding of the first sample of the information signal to the input of the dynamic system all other its samples shall be fed;

in the case when at least part of samples of the information signal defined by the conditions of reliability reaches segments on the abscissa that are defined by the projections of informative line segments, the dynamic system shall be modified by changing these informative line segments in such a manner that the values of first derivatives of $f'_r$ corresponding to the segments of function $f'_r$ shall be less than one;

step-by-step iterations shall be carried out in the modified dynamic system with predetermined initial conditions;

in the case the phase trajectory of the modified dynamic system reaches into one of the K limit cycles the decision on recognition of the identified shall be made;

in the case samples of the information signal do not reaches the segments of the abscissa corresponding to projections of informative line segments, or if the phase trajectory in the course of iteration of the modified dynamic system does not reach any of the K limit cycles the decision to deny the recognition shall be made.

In the case when the product of all the first derivatives of $f'_r$ or each value of the first derivative $f'_r$ is less than one:

when the samples of the $I_S$ information signal is fed to the input of the dynamic system the value of the first derivative f' of function f of corresponding informative segment shall be found;

if the found value of the first derivative f' is more or equal to one the next sample $I_{S+1}$ of the information signal shall be put to the input of the dynamic system, and the value of the first derivative f' shall be determined again;

if the found value of the first derivative f' is less than one then a step-by-step iteration shall be carried out comparing the result obtained by means of this iteration with the sample of the information signal next to the one that has been put to the input of the dynamic system;

in the case of a positive result of the comparison in "h" subsequent iterations (h>1 to be defined by confidence conditions of reliability) the decision shall be made on recognition of the identified object;

in the case of the positive results of the comparison in less than "h" subsequent iteration, the next sample from the sequence of the first M–R samples of the information signal is fed to the input of the dynamic system and repeat the said operation;

in the case of a positive result of the comparison in less than "h" subsequent, iterations when all M–R first samples of the information signal have been put to the input of the dynamic system the decision shall be made to deny the recognition of the identified object.

In another variant of the method for the case when the product of all the values of the first derivatives $f'_r$ or each value of the first derivative $f'_r$ are less than one;

when the sample $I_S$ of information signal is fed to the input of the dynamic system the value of the first derivative f' of function f of the corresponding segment shall be found;

if the found value of the first derivative is more than or equal to one then the next sample $I_{S+1}$ of the information signal shall be put to the input of the dynamic system, and the definition of the first derivative f' shall be repeated for it;

if the found value of the first derivative f' is less than one then P step-by-step iterations shall be carried out in the dynamic system;

the sequences of P samples obtained by means of step-by-step iterations, starting from the sample that started up P step by step iterations shall be compared with the sequence of P+1 samples of the information signal;

in the case both said sequences coincide with the degree of similarity not less than the predetermined one the decision shall be made on recognition of the identified object;

in the case both said sequences coincide with the degree of similarity less than the predetermined one the next of subsequent M–R samples first samples of the information signal shall be put to the input of the dynamic system, and said P step by step iterations and the comparing of the sequences shall be carried out;

in the case of a negative result of the comparison of said sequences when all of M–R first samples of the information signal are fed to the input of the dynamic system the decision shall be made to deny recognition of identified object.

In this method during the selection of the number of N quantization levels;

"n" certain quantization levels in the range L shall be mapped to "n" various initial features for whole set of K reference objects;

if at least in one reference object at least one initial feature is repeated then each "j"-th quantization level (j=1, 2, . . . , n) shall be replace by "n" sub-levels of quantization in the range between the (j−1)-th and (j+1)-th quantization levels, so that each sub-level of quantization designated as the (j, 1)-th level (where l=1, 2, . . . , n) shall correspond to a couple of the consecutive initial features following after each other.

In this case the said replacement of quantization levels shall be made "q" times (q>1) while at least in one reference object the combination of q+1 initial features is repeated, or after the "q" fold replacement of quantization levels their number shall be added with additional quantization levels each corresponding to one repeated combination of q+1 initial features.

In this method:

when the number of the reference objects is increased the representation of each new reference object shall be transformed into a corresponding reference signal similar to the representation of K initial reference objects;

if no level of this new reference signal is equal to any level in K initial reference signals and all the levels of the new reference signals are within the range L, then the number of N quantization levels shall be kept constant;

if at least one level of the new reference signal is equal to any level in one of K initial reference signals, or one level of the new reference signal is not within the range L, then the number of quantization levels shall be increased.

The existence in the present invention of the above mentioned set of essential features not known in the previous state of the art makes it possible to consider it corresponding to the criterion to the criterion of PCT "novelty" (N) and "innovation status" (IS). Below it will be proved that this set of essential features is sufficient to consider this invention corresponding to the PCT criterion "industrial applicability" (IA).

BRIEF DESCRIPTION OF DRAWINGS

References to drawings are given only to illustrate the description for the purpose of more complete understanding of the proposed invention.

DESCRIPTION OF THE PREFERRED EMBODIMENTS

Figure 1:
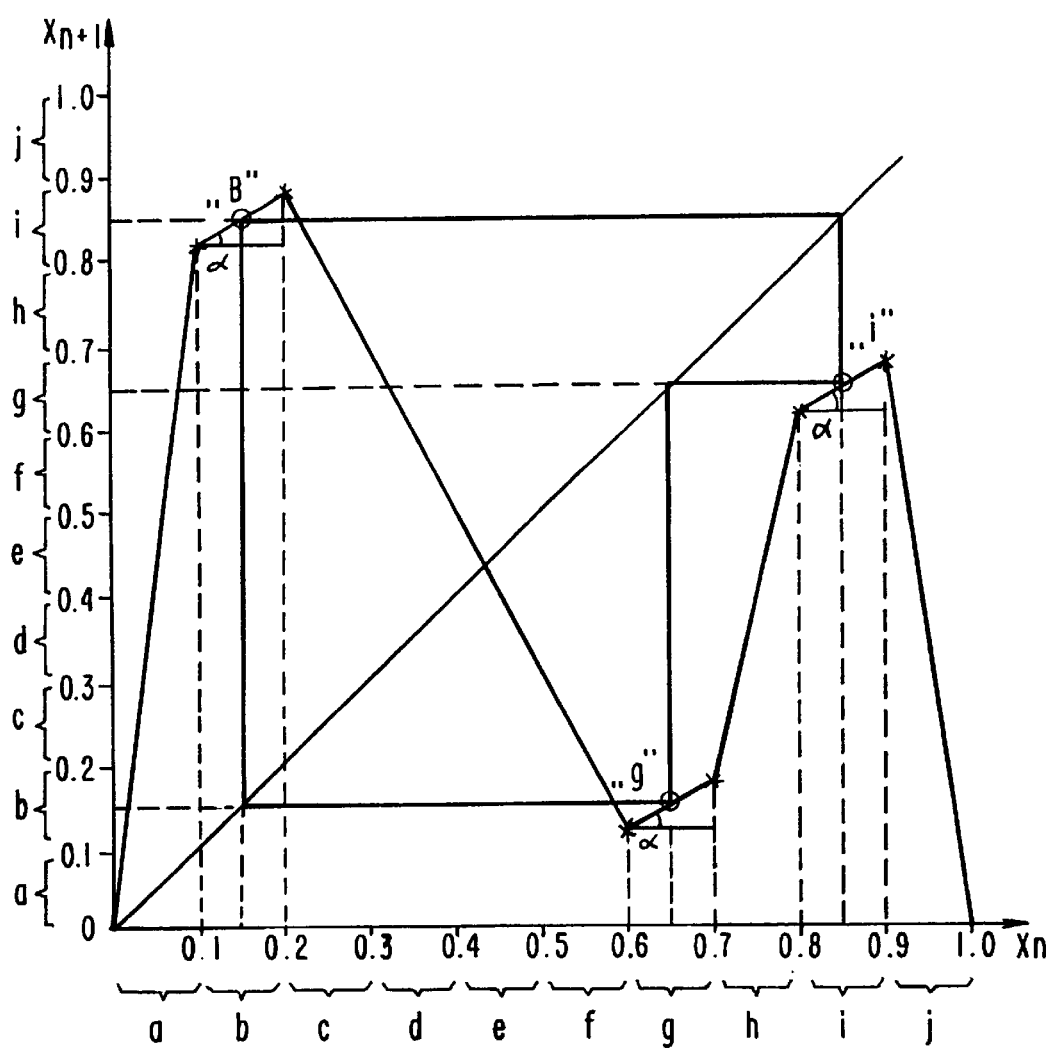
FIG. 1. shows a plotting of a mapping for a dynamic system in accordance with the proposed method.

The proposed method may be implemented both with hardware and software means.

Realization of the method starts with the selection of the reference objects and creation of the corresponding dynamic system.

The type and the number of reference objects is defined by the particularities of the task of recognition. For example, if it is necessary to find who among a number of people was depicted in a portrait of which only a certain part remains, then portraits of all people of said number shall be used as references. If it is necessary to find what expression was on the face of a man in this portrait it is necessary to choose portraits of this man (or similar people) depicting him, for example laughing, crying, angry, etc. as references. In the case of recognition of, a target by a radar, reflection signals from known aircraft and possible natural and artificial interference shall be used as reference signals.

Since reference objects and the object under recognition can be of the most different nature they must be represented in the form of signals differing by a certain parameter. In the case of portraits such, signals may be obtained, for example by reading images (both black and white or color) line by line, then the signals of different objects will differ by change in amplitude. In the case of dialing a telephone number, different digits may differ by the number of pulses or by the frequency of the transmitted signal.

Both human organs of sense and existing sensor devices "feel" the change of appropriate parameter only beginning from a certain, though very small, trigger level. So it is expedient to quantize the signal representing the object of interest by information parameter, i.e. by such a parameter of the signal that is changing with the change in state of the object of interest.

According to this method the quantization of the signal shall be carried out in such a manner that in the set of all reference signals representing different reference objects each quantization level can be met not more than once. In some cases this requirement could not be satisfied. For example, there may be similar digits in telephone numbers which means the presence of several similar frequencies or groups with the similar number of pulses in the signal. It will be shown below how it is possible to realize in these cases the above mentioned requirement "each quantization level shall be met not more that once".

Because of a discrete nature of operation of the dynamic systems used in the present method the signals representing reference objects shall be sampled with the same time step $\Delta t$ according to which the dynamic system operates.

Let us consider the execution of the claimed method at the example of recognition of words composed of first ten letters of Latin alphabet: a, b, c, d, e, f, g, h, i, j. Let us assume that the task of recognition is to find the word "big" among all these words. Let us create for this case a single-dimensional dynamic system of a kind of the mapping of a segment into itself so that in the operation of such a system there be the cycle with a period of 3 corresponding to this word. In order to make the necessary mapping let us plot on the plane ($X_m$, $X_{m+1}$), where m is the number of iteration, points (r, r+1) with coordinates corresponding to couples of symbols (b, i), (i, g), (g, b) and draw a curve through them that provides the existence of a stable limit cycle in the dynamic system passing through these points (A. N. Sharkovsky and others. "Differential equations and their applications. - Kiev; Naukova Dumka, 1986; A. N. Sharkovsky and others. "Dynamics of one-dimensional mapping. - Kiev: Naukova Dumka, 1989.).

FIG. 1. shows the plotting of such a dynamic system. In this figure, 10 segments corresponding to the first ten letters of the Latin alphabet are plotted along each coordinate axis with the same scale. In these axes there are plotted the points circled at FIG. 1 that correspond to appropriate couples of symbols (b, i), (i, g), (g, b), these coordinates (quantization levels) being taken from the middle of the corresponding intervals along coordinate axes. A line segment which will be further referred to as an informative segment with an angle $\alpha<45°$ (i.e. tg $\alpha<1$) to the abscissa is drawn through each of these points within the range of a corresponding interval along an abscissa. The nearest ends of different informative segments with respect to the abscissa, marked with an asterisk at FIG. 1, are connected by straight lines. Extreme ends of extreme informative segments are correspondingly connected with the beginning of coordinates and the end of the segment on the abscissa.

Figure 2:
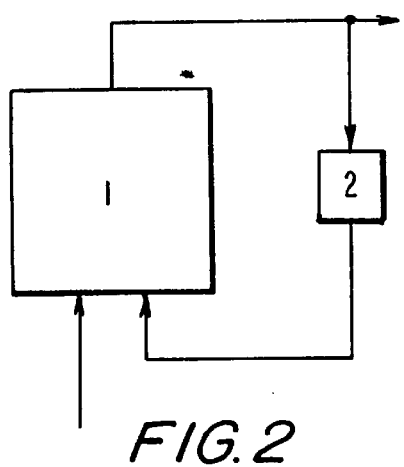
FIG. 2. shows a general block-diagram of the device that realizes this method.

The plotted curve represents the function f(x) of the mapping of the dynamic system, a general block diagram of which is shown in FIG. 2. In accordance with this diagram, the output signal of the mapping unit 1, being the result of mapping at this step of operation is delayed by a delay element 2 for the period $\Delta t$ of one step and is put to the input of the system as a new variable at the next step of its operation. If the signal corresponding to any letter of the recognized word "big" is put to the input of such a system (to the input of mapping unit 1) the oscillating process starts up in the dynamic system, the phase trajectory of which process forming a closed cycle. Actually, if the signal with the amplitude corresponding to the letter "b" is put to the input of the dynamic system then in accordance with the function f(x) plotted at FIG. 1, this signal from the abscissa will be mapped on the output of unit 1 into the signal on the ordinate corresponding to the letter "i". After a delay at element 2, the received signal is put the input of unit 1 where it is mapped from the abscissa to the ordinate into the signal corresponding to the letter "g". After a delay at element 2, the signal received at the second step is transferred to the input of unit 1 and similarly to the above mentioned procedure is mapped into the signal corresponding to the letter "b" at the output of unit 1. Then the cycle is repeated again.

Graphically this cycle may be depicted as follows. Let us draw a bisector between coordinates at FIG. 1. Let us connect the initial point corresponding to the amplitude of the signal initially put to the input of unit 1 by a horizontal line with this bisector. From the point of their intersection a vertical line shall be drawn. It will pass through the point corresponding to the next letter of the reference word. From this point a horizontal line shall be drawn again till it crosses the bisector, and from the point of their intersection a vertical line shall be drawn, etc. As a result of the above procedure we shall obtain a closed figure which represents the phase trajectory of the dynamic system in the case when the signal corresponding to one letter of the reference word "big" is put to the input of unit 1.

The above mentioned closed figure may be plotted only for the points corresponding to couples of symbols (b, i), (i, g), (g, b).

After the dynamic system has been created, the process of recognition may be carried out in various ways. The sequences of values (samples) of the signal corresponding to the identified sequence of letters may be applied in turn to the input of unit 1. In this case, a verification is being carried out in the system whether the first sample of the signal under recognition "fitted" into one of informative segments, and if so then whether the values obtained successively at the output of unit 1 coincide with the sequence of rest samples of the input signal. If one of these conditions is not satisfied, the next sample of the signal under recognition is put at the input of unit 1 as an initial sample and the above mentioned procedure is repeated until it is determined that the signal under recognition coincides with the reference signal, or until in the signal under recognition there is left a predetermined number "R" of unchecked samples, which already cannot ensure that the signal under recognition corresponds to the reference signal (condition of validity) even in the case of successful comparison. In the above example with the word "big" the number R evidently cannot be less than 0.

In another variant of recognition after the initial sample of the signal under recognition has been applied to the input of unit 1 and after the verification whether it "fits" into one of the informative segments has been carried out, P step-by-step iterations shall be carried out in the system, i.e. the mapping of signals coming to the input of unit 1 from the delay element 2 shall be repeated P times by unit 1, and then the sequences of signals obtained from unit 1 shall be compared with the sequence consisting of P samples of the signal under recognition. In the case both sequences coincide, the output signal is considered recognized. If there is no coincidence, or if the initial sample did not fit into the informative segment, the above mentioned procedure shall be repeated for the next sample of the signal under recognition and two sequences, consisting of P sample shall be compared once again. Such repetitions may be carried out until the signal in recognized, or until there are left R unchecked samples, that being defined by the condition of validity.

Figure 3:
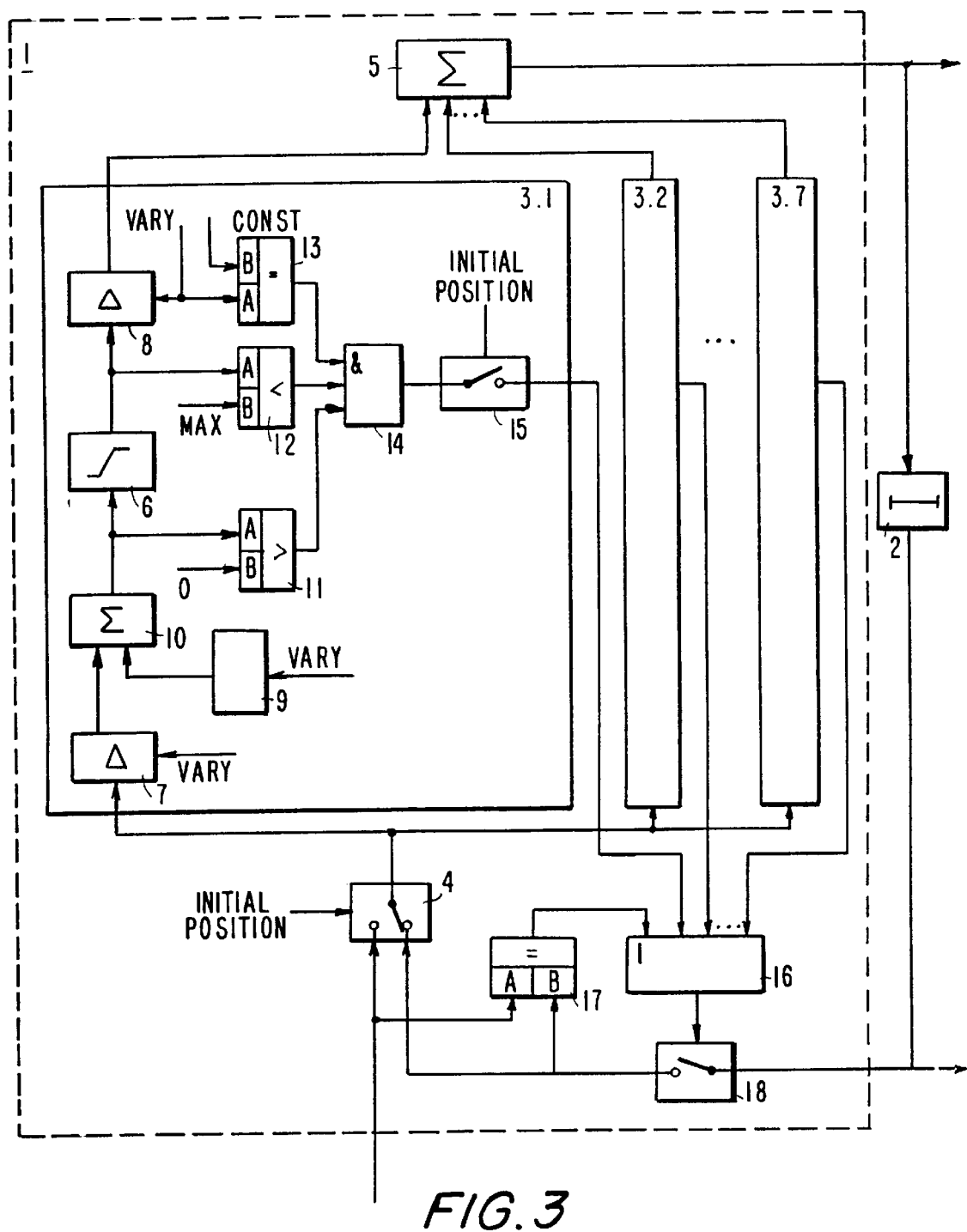
FIG. 3. shows a functional diagram of the device that realizes one concrete variant of the claimed method.

FIG. 3. shows a functional diagram of the device realizing the first of the above mentioned variants of identification for the case shown at FIG. 1. In this embodiment the mapping unit 1 includes a network of formers 3 (3.1, 3.2, . . . 3.7) the number of which is equal to the number of segments (both informative and non-informative) at FIG. 1. Inputs of all formers 3 are connected to the output of switch 4 that carries out at the first moment the feeding of the initial sample to formers 3, and then switching off the input of the mapping unit 1 from the inputs of formers 3 and closing a feed-back loop from the output of the mapping unit 1 through the delay element 2. Data outputs of formers 3 are connected with the inputs of adder 5 the output of which serves as the output of the mapping unit 1.

Figure 4:
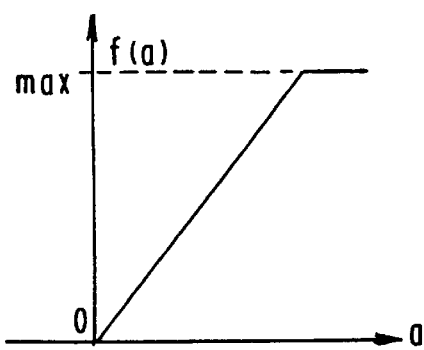
FIG. 4. illustrates the characteristics of the non-linear element.

Each former 3 includes non-linear element 6 with the characteristic, shown in FIG. 4. This may be, for example an operational amplifier with limitation. In addition the former 3 includes the first and the second gain-controlled amplifier 7 and 8 installed at the input and output of former 3 respectively. The output of amplifier 7 and the output of controlled threshold source 9 are connected to first and second inputs of adder 10 respectively. Output of adder 10 is connected through non-linear element 6 and further through the second amplifier 8 to the input of adder 5. In addition the outputs of adder 10 and non-linear element 6 are connected with the first inputs of the first and second comparators 11 and 12 respectively. The second input of the first comparator 11 is connected to the earth (to the line of zero potential), and a signal is applied to the second input of the second comparator 12, corresponding to the upper limit value of non-linear element 6. The "more than" value output (a greater than zero) of the first comparator 11 and the "less than" value output (a less than mix) of the second comparator 12 are connected to the first and second inputs of AND-gate 14 the third input of which is connected to the "equal to" value output (A-B) of the third comparator 13. The signal controlling the gain of the second amplifier 8 is applied to the first input of the third comparator 13, and the signal of a constant value which will be explained below is fed to its second input. Output of AND-gate 14 is connected to the data input of switch 15. Outputs of switches 15 of all formers 3 being their controlling outputs are connected to corresponding inputs of OR-gate 16, the additional eighth input of which is connected with the output "equal" of comparator 17. Output of OR-gate 16 is connected to the controlling input of switch 18, the data input of which is connected to the output of delay element 2, and the output of which is connected to the second data input of switch 4 and one of the outputs of comparator 17 the other input of which is combined with the first data input of the first switch 4. FIG. 3. shows the state of switch 4 and switches 15 in the absence of the signal "initial position" at their controlling inputs, and the state of switch 18 in the absence of the signal from the output of OR-gate 16.

The existence of amplifiers 7 and 8, non-linear element 6 and adder 10 is explained as follows:

Mapping function of the dynamic system is described by the following equation:

$$M(X) = \sum_{i=1}^{N} \beta_i f((x - x_i)/\alpha_i) = \sum_{i=1}^{N} T_i'' f(T_i'x - \Theta_i)$$

where $\alpha_i = x_{i+1} - x_i$ ($x_i$ are node points of a piecewise-linear function, i.e. x-coordinates of the beginnings the and ends of informative segments plus the point of the beginning of a segment on the abscissa and the point of the end of this segment), e $\beta_i = y_{i+1} - y_i$, $T_i' = 1/\alpha_i$ are the gains of input amplifiers 7, $T_i'' = \beta_i$ are the gains of output amplifiers 8, and $\Theta_i = x_i/\alpha_i$ are threshold values established by controlled threshold sources 9.

The number of formers 3 is defined by the number of linear sections of the mapping function and shall not be less than 2n+1, where n is the total number of informative segments of the mapping. In particular, for the mapping function shown in FIG. 1 it is equal to 7.

The total adding of signals from all the formers 3 is carried out by adder 5.

Comparators 11 and 12 jointly sense the state whether the input signal has reached the informative or non-informative segment to which the given former 3, corresponds. Comparator 13 compares the controlling signal of the output amplifier 8 with a constant value corresponding to the slope of an informative segment inclined to abscissa with an angle less than 45°.

If in a presence of the signal "initial position" at the controlling inputs of switch 4 and switches 15 of all formers 3 the input sample fits to some informative segment, the signal from the output of the corresponding AND-gate-gate element 14 passes to the controlling output of this former 3 through switch 15. In this case at OR-gate 16 the signal is received which activates closing of switch 18. The feedback loop of the dynamic system will be switched on, because the signal of the initial position is removed and switch 4 will be turned into the state shown in FIG. 3. (It is assumed for convenience that all control signals from comparators 11–13 are kept for the delay time Δt at element 2.). Then at the next step of iteration the delayed signal from the output of adder 5 will come to switch 4, and further to formers 3. In addition, the same signal will come to then input of comparator 17 at the other input of which the next sample of the signal under recognition will be received at the same time. In the case these signals prove to be equal, comparator 17 will close again the switch 18 (or will prevent its opening) through OR-gate 16. The system will carry out one more iteration, etc. Cyclic operation of the system may be indicated either by the signal from the output of the mapping unit 1 or by the delayed signal from the delay element 2. It is possible to use either the cyclic signal itself indicated at an appropriate display or the signal of its presence for such an indication.

In the case when the input sample does not fit into any of the informative segments, i.e. no signals from formers 3 are coming to OR-gate 16, the signal "initial position" is not removed, and the next sample of information signal is put to the input of the system.

Figure 5:
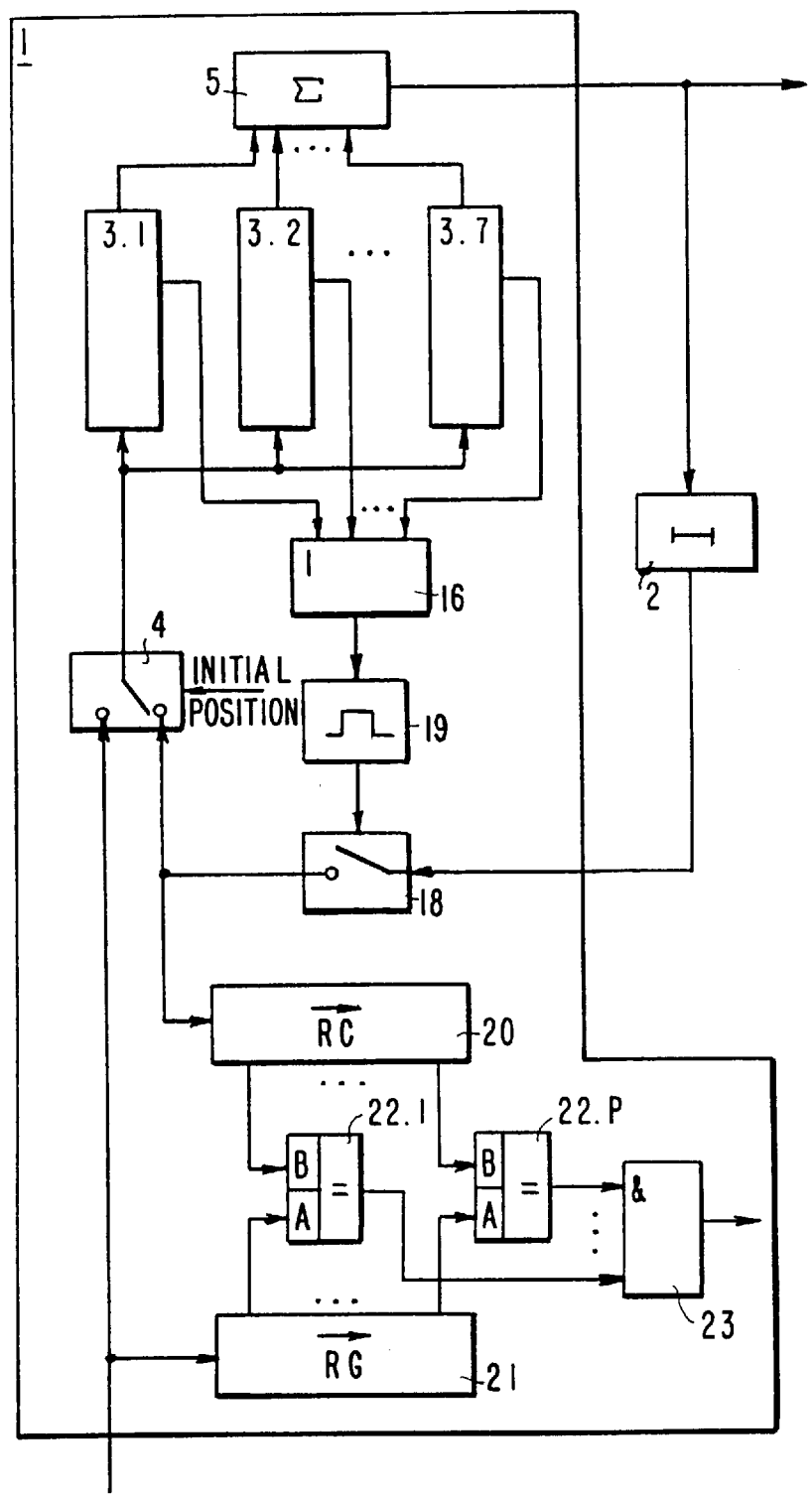
FIG. 5. shows a functional diagram of the device for the implementation of another concrete variant of the claimed method.

FIG. 5 shows a functional diagram of another variant of recognition (by the comparison of two sequences). In this variant the numeration of FIG. 3 is kept, so that units and elements with similar numbers in both Figures are the same, too. The difference of FIG. 5 is the absence of comparator 17 and the introduction of pulse former 19 between the output of OR-gate 16 and controlling input of switch 18, and also the addition of two memories 20 and 21 the inputs of which are connected to the input of the system and the output of switch 18, respectively, and corresponding outputs from 1 to P-th are connected with inputs of comparators 22 from 1 to P, the outputs "equal" of which are connected to the inputs of AND-gate-gate 23. In this circuit when the first sample of tie signal under recognition "fits" into one of the informative segments, the signal from the output of OR-gate 16 starts up the former 19, which generates pulses with the duration PΔt. During all this period the switch 18 remains closed, and both the input signal under recognition and the signal from the output of the mapping unit 1 delayed at element 2 comes to the corresponding memories 20 and 21 (of shift register type). If at the end of P iteration steps there are couples of similar signals at the inputs of all comparators 22, the signal indicating the fact of recognition will come from the output of AND-gate-gate 23.

Figure 6:
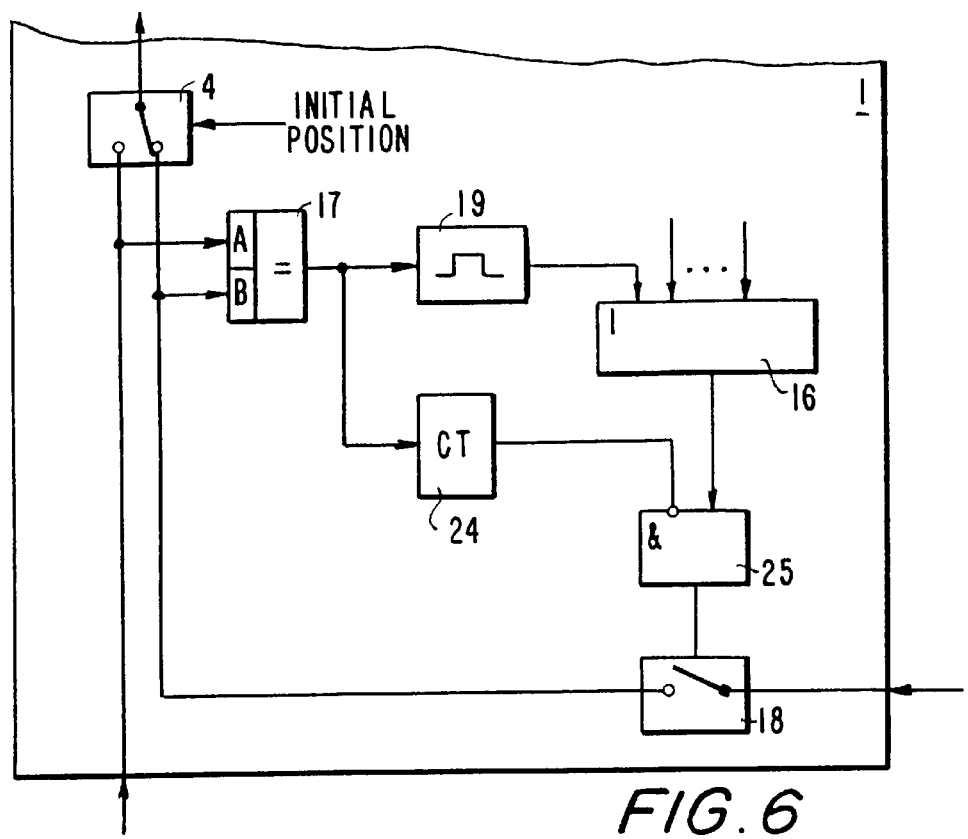
FIGS. 6 and 7. show variations of the functional diagram shown at FIGS. 3. and 5 respectively.
Figure 7:
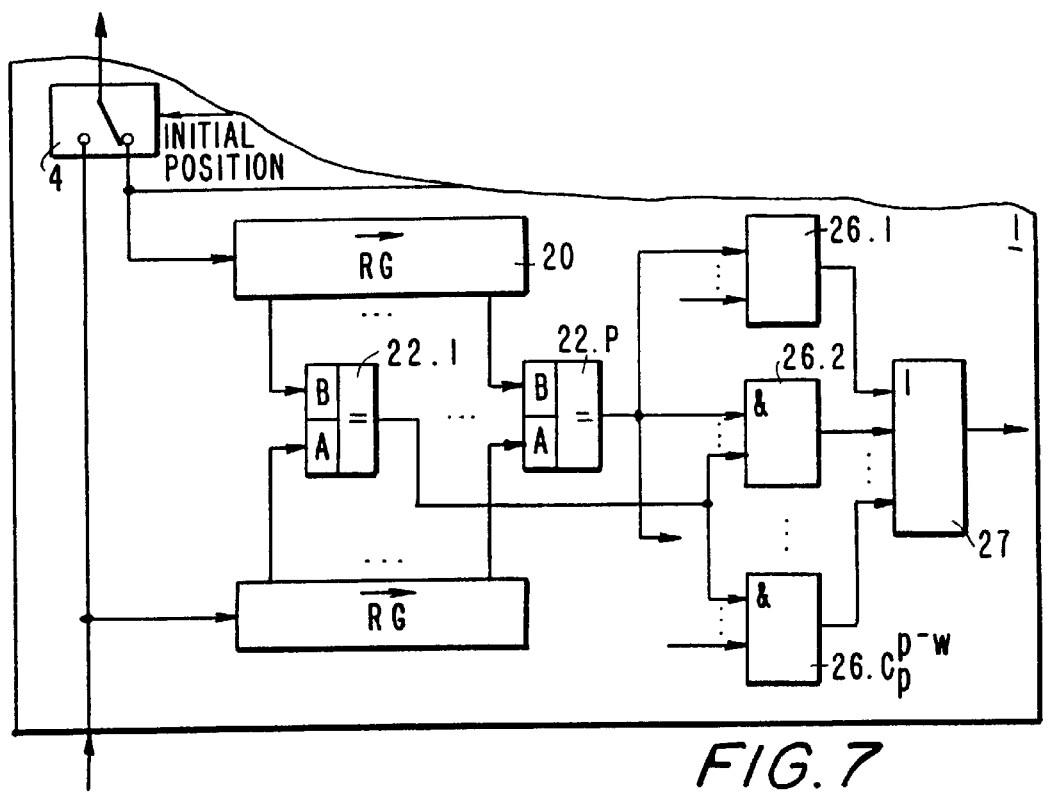

The diagrams in FIG. 3 and FIG. 5 illustrate only a general approach to the arrangement and functioning of dynamic system. It is evident, that in general, making these diagrams more complicated, at the initial moment at the input of the dynamic system samples of the signal under recognition may be put, and in this case the switch 18 will be closed only if all these samples "fit" into corresponding informative segments. Errors are also admissible in the sequence of samples of the signal under recognition. For example, if according to conditions of validity, W errors are allowed for P samples (P>W), the diagram in FIG. 3 should be complemented in the following way (see FIG. 6.) It is necessary to install a pulse former 19 between comparator 17 and OR-gate 16 with pulse duration WΔt (for the case if all W errors will be in succession), and in addition the output of comparator 17 should be connected to the input of counter 24 with the count range W. Overflow output of this counter 24 is connected to the inhibition input of INHIBITION-gate 25 installed between OR-gate 16 and switch 18. The diagram in FIG. 5 should be changed for this case in the following way (see FIG. 7). Outputs "equal" of comparators 22 shall be connected in all possible combinations of P AND-gates 26 taken P–W at a time with the inputs $C_p^{P-W}$ (where $C_p^{P-W}$ is the number of combinations of P taken P–W at a time) the outputs of which are connected to the inputs of OR-gate 27. In both cases the presence of not more than W errors in the sequence of samples of the signal under recognition will not influence the result of recognition.

It should be noted that in order to provide stability of a limit cycle in the dynamic system with such a mapping function it is necessary to provide that all the lines connecting the ends of informative segments should have the slope angle to the abscissa of more than 45°. So if any connecting line has the slope less than 45° it should be changed with two lines connecting the ends of this changed line with the point on the abscissa that represents the projection of some point (for example, the middle point) of the changed line. In accordance with the above unit 1 shall be added with one more former 3 for each line being changed.

Generally, informative segments and connecting lines should not necessarily be straight ones. The two following conditions should be met for them: each of these lines (segments) must have single-valued projection on the abscissa, that is each of these lines must be a single-valued function f of the argument along the abscissa, and in addition the first derivative f' of this function f in the predetermined point (corresponding to quantization level) must have the predetermined value. In the case of FIG. 1, this predetermined value for all three points has been chosen to be less than one. Generally, it is sufficient that the product of the above mentioned derivatives be less than one.

The method under consideration, however, can be also realized when the product of all first derivatives f' of the informative segments in the corresponding points is greater than one. In this case a mapping function is such that the limit cycles with recorded information are not stable. In this case the recognition is performed as follows. All samples of the signal under recognition are put to the input of the dynamic system as initial conditions. In the points of the mapping function which the samples of an information signal fitted to, and which belong to informative segments the value of the first derivative f' should be changed in such a manner that the product of the first derivative of corresponding lines that have been changed should be less than one (for example, each derivative f becomes less than one.) Then in this modified dynamic system the step-by-step iterations shall be carried out. If in this case the phase trajectory of the dynamic system converge to one of limit cycles (that became a stable one) then the object corresponding to such information signal is considered recognized. This variant of the method may be considered to be preferable.

Figure 8:
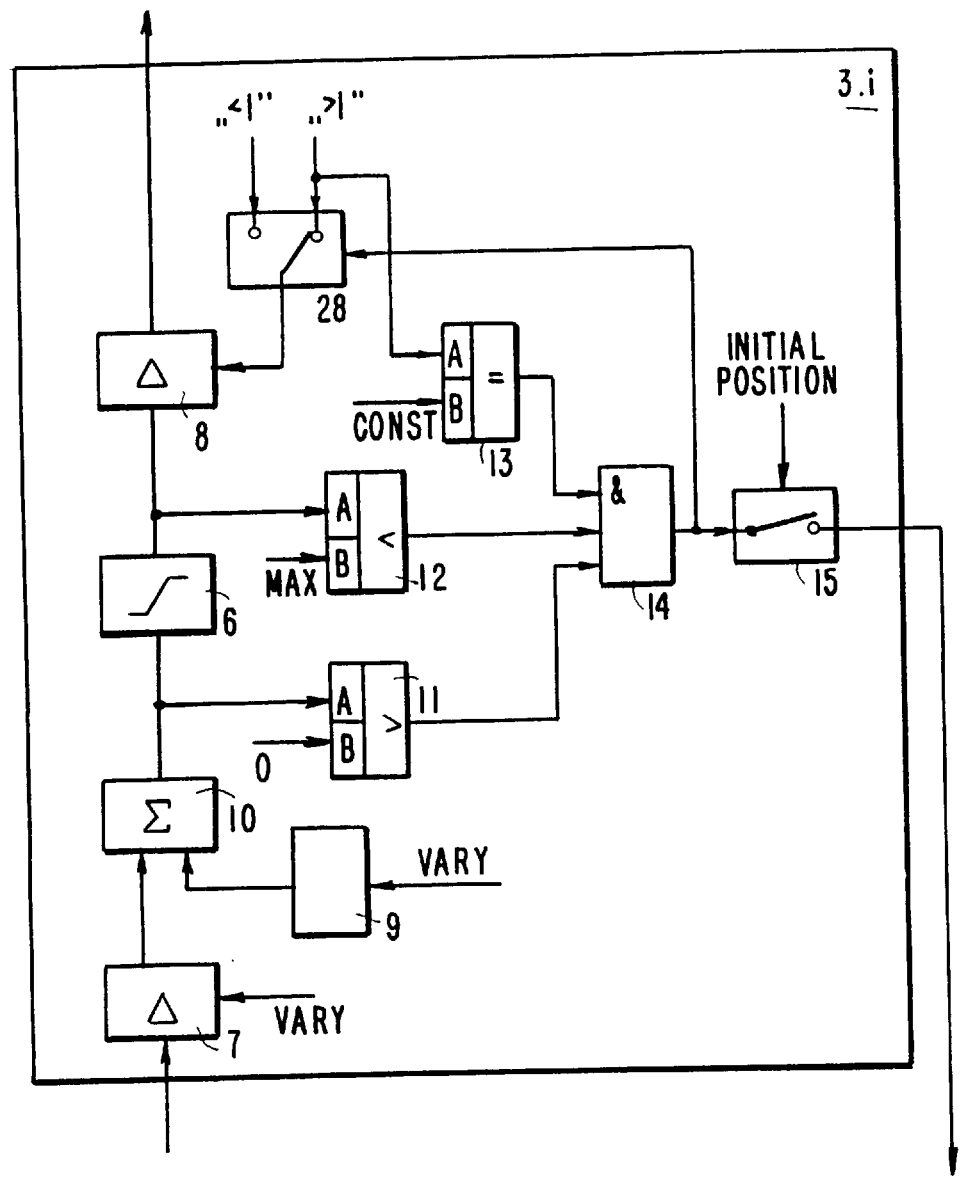
FIG. 8. shows a functional diagram of the device that realizes the third concrete variant of the claimed method.

Realization of this variant is carried out in the circuit (FIG. 8), where unlike the circuit from FIG. 3 switch 28 is introduced into each former controlling input of switch 28 is connected to the output of AND-gate 14, and the output of switch 28 is connected to the input of gain-controlled amplifier 8, and various signals providing the slope of the given informative segment more or less than 1 are put to the data inputs of switch 28. In this case switch 18 is closed simultaneously with the feeding of the last sample of the input signal from the set of the signals fed to the input of the system (OR-gate 16 and comparator 17 are absent). According to this variant, in the case any sample fits into informative segment, switch 28 of the corresponding former is switched from the state shown in FIG. 9, that corresponds to the signal providing the slope of informative segment to the abscissa less than 45°. If all samples fed to the input of the dynamic system fit into informative segments and their number is sufficient for the confidence condition then the product of the first derivatives f' for the system modified in such a manner will become less than 1, and in this system the limit cycle indicating identification of the corresponding reference will be established.

When it is necessary to identify other words consisting of first ten Latin letters in addition to the word "big", including words with repeated letters ("bed", "bee", etc.), the dynamic system plotted in accordance with FIG. 1. is not sufficient already. In this case the following method of extending the initial "alphabet" (number of quantization levels) is applied. Each interval on coordinate axes corresponding to one letter in FIG. 1 shall be divided into 10 intervals, each corresponding to one of the initial letters (See FIG. 9.) In this case a new interval is related to each couple of initial letters, the position of which on the coordinate axis is defined in the following manner: the first letter of the couple corresponds to the former "large" interval, and the second letter corresponds to a new "small" interval within the large one.

It is evident that each new interval corresponds to its own couple of letters. Carrying out the plotting of informative segments in the points corresponding to couples "bi", "ig", "gb" and connecting the ends of these informative segments similar to the procedure in FIG. 1. we shall obtain a new mapping function for the recognition of the word "big" taking into account a new "alphabet" Consisting of one hundred pairs of initial letters.

Figure 9:
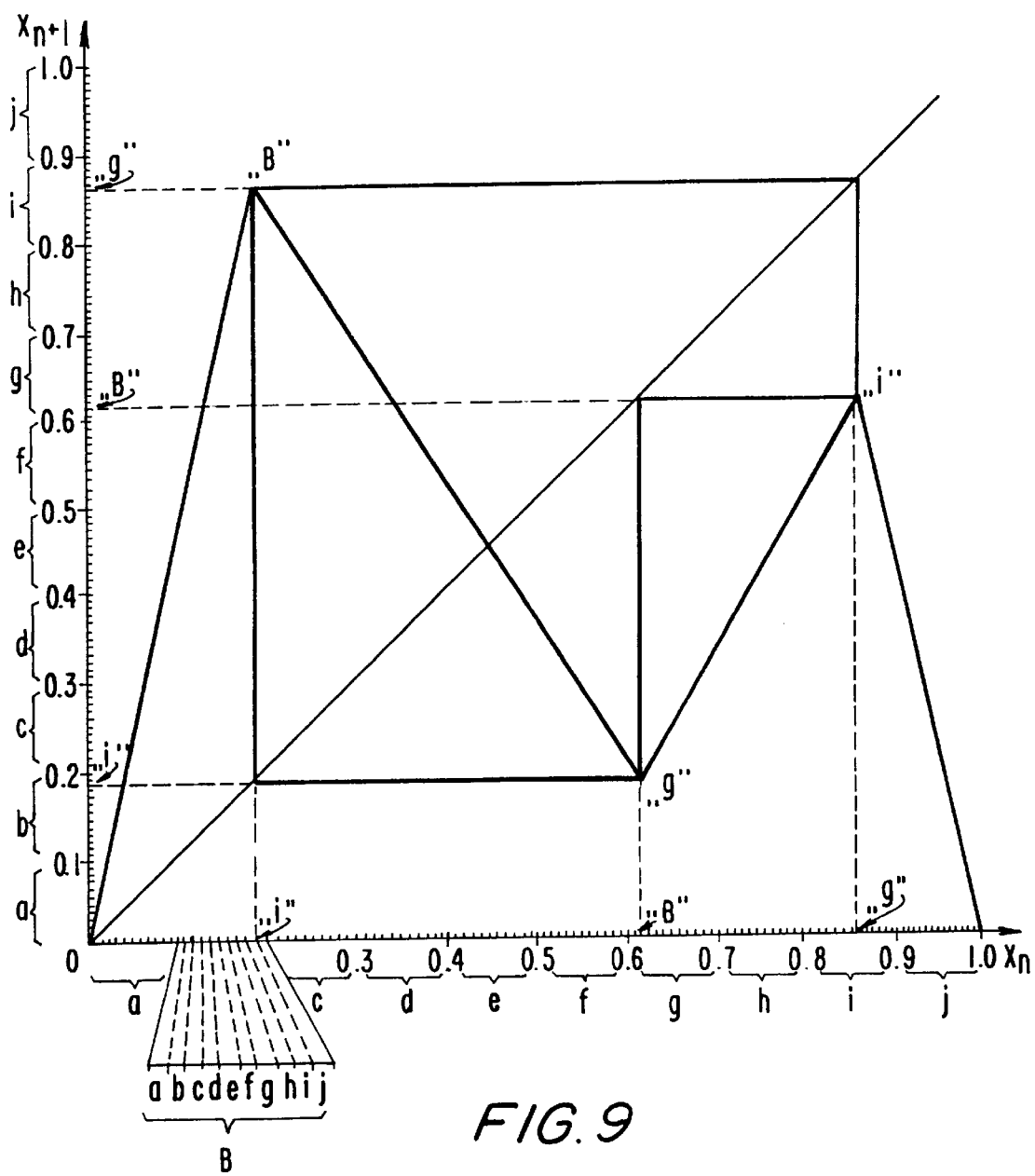
FIG. 9. shows a plotting of a mapping of the dynamic system with the increased number of quantization levels.

The plot of such a dynamic system may made according the same procedure that was used in FIGS. 3 or 5. The difference of the system with the mapping function shown in FIG. 9 is in the change of the value of controlling signals and also in the fact that the signals which correspond to the couples of initial letters shall be taken as initial signals. In such a dynamic system the word "big" will be identified in any text which contains no words with the couples of letters "bi", "ig", "gb".

If there are such words as "bice", "jig" or "fig" (abbreviation of "Figure") in the text, the number of quantization levels may be further increased by dividing each "small" interval corresponding to the couple of initial letters to ten parts, and by plotting a new mapping function with informative segments passing through the points "big", "igb" and "gbi". Signals corresponding to triples of the initial letters shall be put to the input of such a dynamic system as the initial condition.

The above division of intervals (the increase in the number of quantization levels) may be continued in principle and is limited by only technical reasons. In the case of hardware realization of this method with q-fold divisions, the elements with sensitivity and accuracy less than $n^{-(q+1)}$ are required. If this method is applied in the form of software, the number q is limited by the capabilities of the used computer.

In addition to the above mentioned increase in the number of quantization levels it is possible to use the so called preliminary coding. In this case when after q-fold changes (division) of quantization levels, the repeating fragments (sequences of the initial letters of the length q+1) can be found in the text, then the corresponding new quantization level is assigned to these text fragments, regardless of the of their repetition. For example, in the dynamic system with the mapping system shown in FIG. 9, i.e., after a single (q=1) change of quantization levels has been carried out the fragment "bibi" may be put in correspondence with an additional quantization level.

In all the above mentioned examples the recognition of text was referred to make explanations more clear. But the method under consideration is applicable to any other objects represented by a signal, the amplitude, frequency or any other information parameter of which can be quantized within the whole possible range L of this parameter variation. For example, if the amplitude of a signal has been chosen as the information parameter, this range is limited by the amplitude characteristics of the used amplifiers, analog-to-digital converters, etc.

In the case when the discussed method is being realized in the form of a software in a processor or a computer, the algorithm of plotting the dynamic system similar to the one shown in FIG. 1 or FIG. 9 may be realized in accordance with the block-diagram of FIG. 10 in the following manner.

Let the following sequence of symbols (information block) be given:

$$a_1 a_2 \ldots a_n,$$

each element $a_i$ of which belongs to an alphabet consisting of N symbols: $b_1, b_2, \ldots b_N$. In accordance with the proposed method the elements of this alphabet shall be considered as quantization levels of a signal, i.e., each element of the alphabet is related to its own quantization level.

For the sequence $a_1 a_2 \ldots a_n$ a single-dimensional mapping of the segment into itself shall be made, having a stable limit cycle with the period n, the elements of which are in one-to-one correspondence with the elements of the sequence $a_1 a_2 \ldots a_n$. In the most simple case the value of the mapping variable and the interval of values of the variable iterated in the mapping corresponds to each element of the alphabet, the length of this interval (the distance between quantization levels of the signal) being equal to 1/N.

In the same way the mapping may be obtained containing not one but several stable limit cycles, the elements of which are in one-to-one correspondence with the elements of the recorded sequences similar to the sequence $a_1 a_2 \ldots a_n$. However, in this case the possibility of information recording is rather limited. For example, it is not possible to record sequences containing even two same symbols. In order to overcome this limitation N quantization sub-levels are introduced at each of N quantization levels, then N new sub-levels are introduced for each N sub-level and so on. This procedure is repeated q times (FIG. 10.). Then the mapping is made with the value of the variable corresponding not to one element of the sequence $a_1 a_2 \ldots a_n$, but to q elements coming in succession. Such a generalization of the structure of mapping makes it possible to record any sequences of symbols in which similar fragments consisting of q and more elements are absent. In the opposite case the recording of the information block is not possible even if q successive quantizations were used. In order to overcome this problem it is necessary to carry out additional quantization of levels. But this approach shows principle limitations. The fact is that in the case a certain number $q_{max}$ of subsequent quantization is exceeded, the length of informative intervals on the mapping becomes very short, and when computerized evaluation is made it is necessary to change single-precision calculations to double-precision calculations which leads to negative sequels (a decrease in the rate of plotting the dynamic system, an increase in the required volume of memory, etc.).

Figure 10:
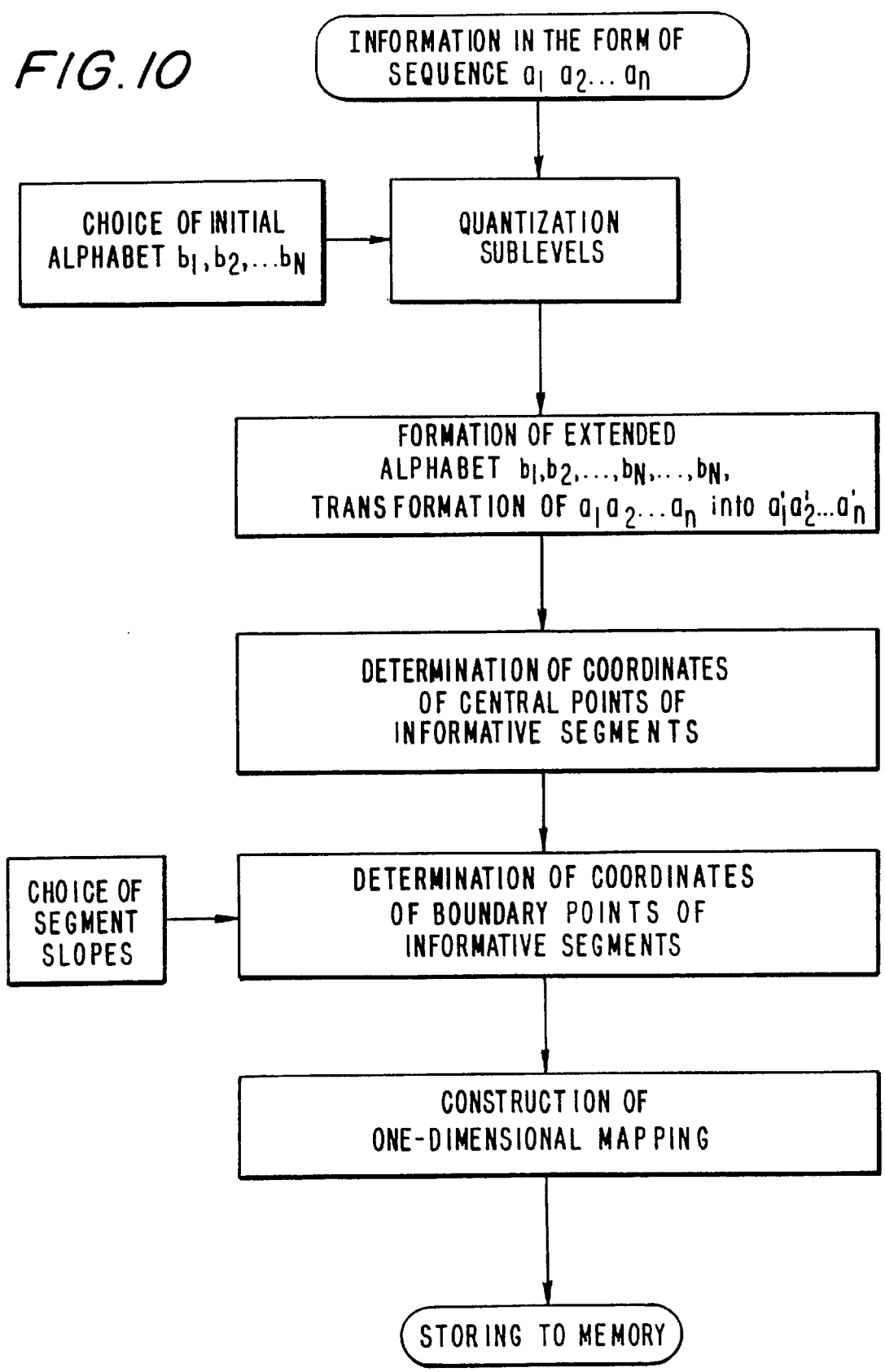
FIGS. 10. and 11. show a block-diagram of program algorithms for creating dynamic system and recognition identification of information signal respectively.

A decisive breakthrough in the capability of recording arbitrary sequences can be made by means of a special coding and introduction of an extended alphabet (FIG. 10.). The essence of this approach is as follows. Let the sequences which are intended for recording with the help of q subsequent quantization levels have several identical fragments of the length q. Then a new additional element is introduced into the initial alphabet, and in all recorded sequences these fragments shall be changed with the new element of the alphabet. If in the new representation of sequences (with the use of an additional element of the alphabet) the identical fragments are found with the length q, these fragments again shall be changed with an additional element of the alphabet. The procedure of the extending the alphabet is carried on until in the recorded informative sequences no repeating fragment with the length longer than or equal to q is left. In the result of such a coding the initial sequence $a_1 a_2 \ldots a_n$ is represented in the form of the sequence $a'_1 a'_2 \ldots a'_{n'}$, where $n' \leq n$, the element of which are the elements of the extended alphabet $b_1, b_2, \ldots, b_N, \ldots, b_{N'}$.

Then in accordance with the proposed method for the obtained representation of the reference signal the dynamic system similar to the mapping of a segment into itself shall be formed (in the considered case d=1, and d-dimensional cube is reduced into a line segment). For this purpose a certain interval must be put in correspondence to each element of the extended alphabet like in the case of the word "big" (FIGS. 1 and 9) considered above. Then the coordinates of central points of informative segments shall be found in the plane (X, Y), each fragment $a'_i \ldots a'_{i+q-1}$ being put in correspondence with the only one point on the coordinate plane. Then informative line segments (in the most simple case represented by straight lines) shall be drawn through these points, and then, taking into account the slope dx/dy chosen for them, the coordinates of the boundary points are determined. In accordance with the found coordinates of the boundary points a one-dimensional mapping in the form of piecewise-linear function passing through the beginning of coordinates and the point on the axes X corresponding to the upper limit of the quantization range L (for example, point (1, 0), when all values are normalized to L=1) shall be mapped for informative fragments. The mapping obtained in this manner is then recorded in the computer's memory.

Figure 11:
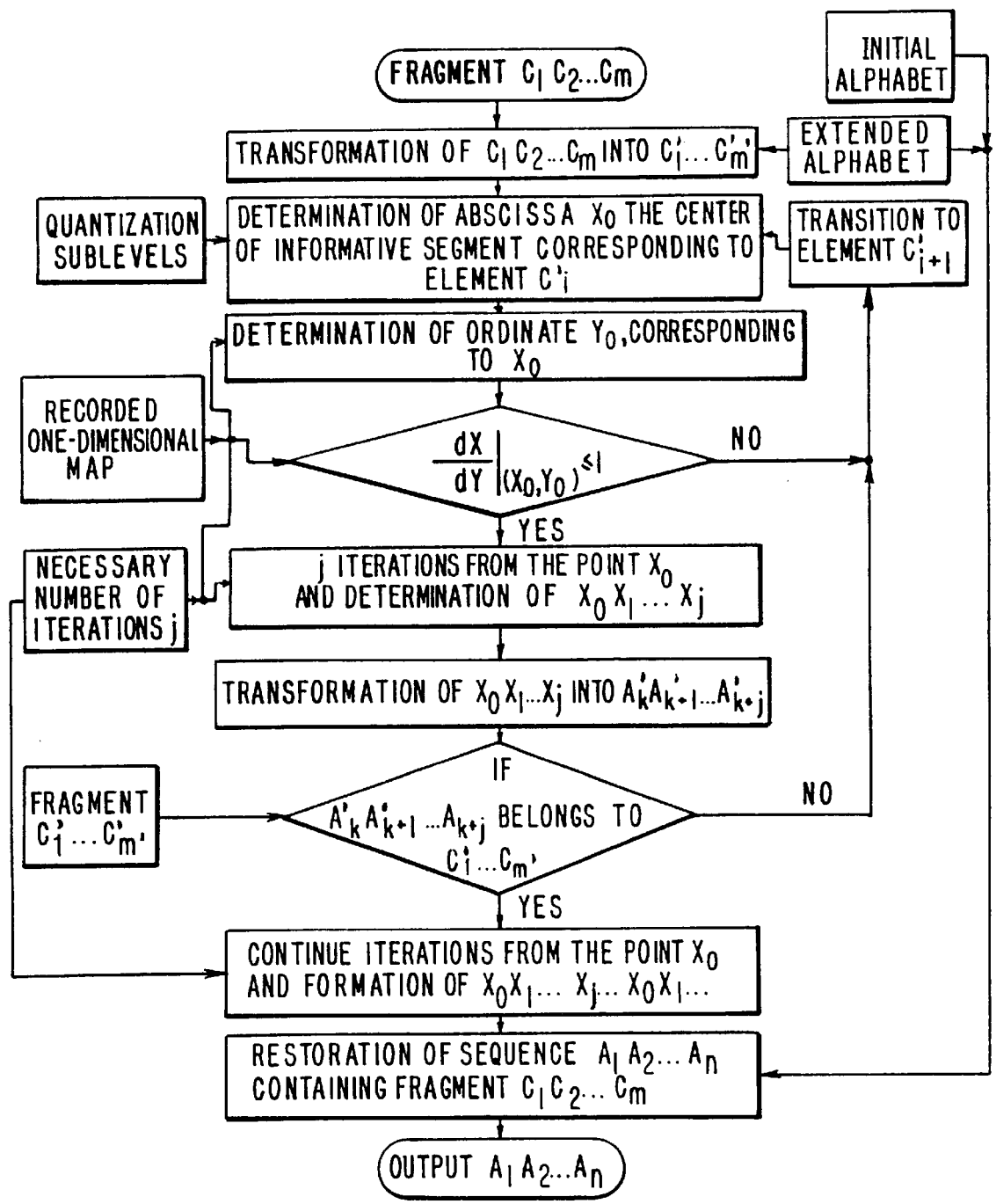

The recognition of the information signal in such a system is carried out in accordance with the block diagram of the algorithm given in FIG. 11, as follows.

Let the sequence $c_1 \ldots c_m$ be submitted for recognition, each element of which represents one of the elements of the initial alphabet $b_1, b_2 \ldots b_N$. The task of recognition is in determination of the fact whether the sequence $c_1 \ldots c_m$ is a part of the sequence $a_1 a_2 \ldots a_n$. Since the above mentioned mapping for $a_1 a_2 \ldots a_n$ has been plotted for its representation in the extended alphabet, that is for the sequence $a'_1 a'_2 \ldots a'_{n'}$ then the information sequence $c_1 \ldots c_m$ submitted for recognition must be presented (expressed) by elements of the extended alphabet. In the result of the coding the sequence $c_1 \ldots c_m$ with the help of the elements of the extended alphabet its new representation shall be obtained in the form of $C_{1'} \ldots c_{m'}$, where $c_{i'}$ is an element of the extended alphabet $b_1, \ldots, b_N, \ldots, b_{N'}$.

It may seem that in order to represent the submitted fragment in the extended alphabet, it is sufficient to compare all the fragments of the length q in this fragment with the elements of the extended alphabet that have the same length and to carry out corresponding substitution in the case they coincide. But in fact it does not always leads to correct (adequate) coding. Actually it is a typical situation when the beginning of the submitted fragment represented in the initial alphabet in the course of adequate coding does not coincide with the beginning of the first coding element of the extended alphabet. So for this situation the task of the recognition of a sequence by its fragment is not trivial. It may be resolved in the following manner. For the convenience it is assumed below that the second quantization (introduction of sub-levels of quantization) is carried out only once, i.e. q=1.

Let us consider the first two elements of the submitted fragment $c_1 c_2$. If in the extended alphabet there is an element $b_{i'} = c_1 c_2$ let us make a change in the fragment $c_1 C_2 \ldots c_m$ with the use of designation $c_1' = b_{i'} = c_1 c_2$.

$c_1' c_3 \ldots c_m$

If $c_1' c_3 \ldots c_m$ includes other elements similar to $c_1 c_2$ they shall be changed also with $b_{i'}$. If the extended alphabet does not include the element $b_{i'} = c_1 c_2$ tile couple $c_2 c_3$ shall be considered, and the procedure shall be repeated, etc. In the first case (element $b_{i'} = c_1 c_2$ found) the presence of the element $b_{i+1'} = c_1' c_2$ in the extended alphabet shall be checked, etc. In the result of the above procedure a certain representation of the submitted fragment in the extended alphabet is obtained. The important feature of this representation is the fact that even if the beginning of the submitted fragment does not coincide with the beginning of one of the elements of the extended alphabet in the case of adequate coding (and this case is a typical one) the first piece of the submitted fragment corresponding to a complete element of the extended alphabet in adequate coding will be coded correctly.

Really, if $c_1 \ldots c_1$ is a piece of a fragment which represents only a part of the element of the extended alphabet in adequate coding, then the representation of this piece in the extended alphabet will be equivalent to "garbage"—the sequence $c_1 \ldots c_1$ of the elements of the extended alphabet which is absent in the corresponding recorded information block in the course of its representation by means of the extended alphabet. The piece $c_{1+1} \ldots c_{1+g}$, where $g \geq 1$ is the first one in the submitted fragment which the element $c_{1'+1}$ of the extended alphabet in adequate coding corresponds to. Subsequently adequately coded elements $c_{1'+2} c_{1'+3} \ldots$ go. But in the end of the submitted fragment may be several elements of the initial alphabet which comprise only a part of elements of the extended alphabet in adequate coding. Their coding gives "garbage" in the result.

After the submitted fragment has been represented in the extended alphabet the search for informative districts in the representation corresponding to the elements of this representation shall be carried out. For this purpose it is necessary to check whether the informative district corresponds to the first couple of the elements of the fragment. If it does, then iterations of the dynamic system shall be carried out for j steps with the initial conditions corresponding to the first couple of the elements of the submitted fragment. Then the conversion of the obtained data $x_2 \ldots x_{j+1}$ into a symbolic form (through the elements of the extended alphabet) shall be carried out, and the resulting elements shall be compared with j elements of the submitted fragment. In general, the fragment starts with elements $c'_1 \ldots c'_{1'}$ which corresponds to "garbage", and do not correspond to the informative districts. So verification of coincidence gives a negative result, and the procedure is repeated once again, starting with $c'_2$, etc. When at last a couple $c'_{1+1} c'_{1'+2}$ will be taken, there will be coincidence of j elements obtained in the result of iterations of the system and the elements $c'_{1'+2} \ldots c'_{1'+j+1}$ placed after $c'_{1'+1}$. Now the input fragment is identified, and iterations of the dynamic system are to be started until a complete restoration of the initial information sequence $a_1 \ldots a_n$ containing fragment $c_1 \ldots c_m$.

Figure 12:
FIGS. 12. and 13. show practical realization of the method for the case of recognition of photographs by their fragments.
Figure 13:
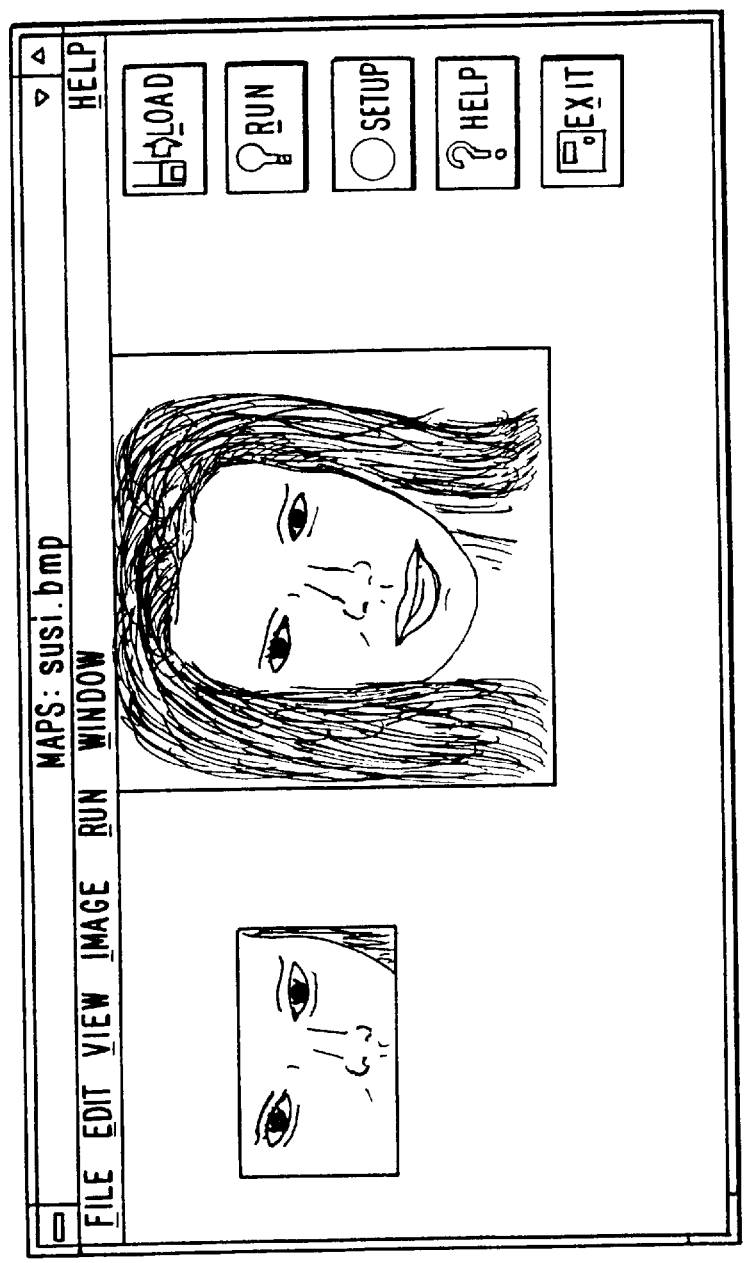

As an example of practical application of the method, let us consider its realization in the form of an algorithm for associative search and recognition of photographic images recorded on limit cycles of a dynamic system of the type of a mapping (FIGS. 12 and 13). Each of 9 photographs recorded into a data carrier (FIG. 12) represents a pattern with the dimensions of 100×100 with 16 gray-scale levels recorded on a separate limit cycle. The algorithm allows:

to import various photo-images both belonging to the data base and any arbitrary images;

to select arbitrary chosen fragments of photographic images for presentation and recognition.

After a fragment has been presented and the "search" mode started up the image of the fragment being presented will be shown at the display, or otherwise at the presentation of the plotted fragment or image the indicator panel will light up with the report "fragment is insufficient". The volume of the recorded information in the data base is 45 kB. Recording time (PC 486DX50) is~30 sec. Time of search for an image by its fragment is less than 100 msec. The minimum area of the fragment being presented in relation to the whole area of an image (positive outcome) is 4–5%. The degree of possible distortions in correctly recognized object (the number of error pixels in relation to the total number of pixels) is up to 25%.

The proposed method of recognition of objects may be used for the creation of systems for the personal identification, recognition of fingerprints, recognition of banking documents and signatures, processing of speech, including recognition and restoration, recognition of handwritten and printed texts, recognition of scenes and other objects. It may be also applied to the development of fast correlators, means of fast associative memory, associative graphical and text data bases, computerized libraries with associative access, multimedia systems, etc.

The main advantages of the present method which make it quite attractive for the application in the creation of various systems of recognition and intellectual systems are as follows:

possibility to work with big and very big volumes of data with short time of object recognition. The matter is that the process of recognition in the present method requires relatively small number of operations. Even in the case of the realization of the present method in the form of an algorithm, recognition time increases as log N, where N is the total volume of information contained in recorded objects;

stability to noise in the objects being recorded or presented, the allowable degree of noise increasing with an increase in informative saturation of the object under recognition; in particular it allows to create fast systems of search for the textual information in the presence of a lot of mistakes in the text;

possibility to present for recognition not only the whole object but its small fragments;

in contrast to majority of other methods the formation of characteristics according to which the recognition takes place automatically, in the process of application of the present method itself as the result of "self-structuring" of the primary information elements (elements of the initial alphabet) into "words" representing elements of the extended alphabet and being unique units in the final representation of the objects.

All the above mentioned concrete examples, as well as concrete diagrams of devices have been given only as illustration which does not exhaust cover the whole essence of the present method, which is characterized below in the following claims.

We claim:

1. A method for recognition of objects, comprising:

transforming representations K of reference objects into corresponding reference signals, sampled with a predetermined step $^\Delta t$, and quantized into information parameters along an entire range L of variations at N levels, N being a number selected in such a way that each of N quantization levels can be found in the set of all K reference signals not more than once;

formatting for the set of all K reference signals, a dynamic system, which can be described with not less than a predetermined degree of approximation by a mapping of a d-dimensional cube ($d \geq 1$) into itself, being time iterated with a predetermined step $^\Delta t$ and which comprises K limit cycles each corresponding to one of K reference signals;

transformation of the representation being into samples $I_S$ (S=1, 2, ... M; M≥N) of information signal sampled with a time step $^\Delta t$ and quantized into the information parameters in the range L according to said N levels;

feeding of samples $I_S$, ..., $I_{S+B}$ (B=0, 1, ..., so that M−S−2B≥R, where R≥1 is defined by a confidence condition) of information signal to an input of the dynamic system as initial conditions of its functioning;

deciding on recognition of an object in accordance with the result of the functioning of the dynamic system;

after feeding the samples $I_S$, ... $I_{S+B}$ of the information signal to the input of the dynamic system, operating the dynamic system to:

in a case where a phase trajectory of the dynamic system in the process of its functioning does not reach any K limit cycles, inputting the samples $I_{S+B+1}$, $I_{S+2B}$ of the information signal to the dynamic system as initial conditions for its operation, and starting the dynamic system up again;

in a case where a phase trajectory of the dynamic system in the process of its functioning reaches one of its K limit cycles, comparing a reference signal corresponding to this limit cycle to the information signal;

the decision on recognition of an object being made in the case the information signal coincides with said reference signal with a degree of similarity not less than a predetermined one;

the reference signal coinciding with the information signal with the degree of similarity not less than the predetermined one being indicated; and in a case where said reference signal coincides with the information signal with the degree of similarity less than the predetermined one, or in a case where the phase trajectory of the dynamic system in the process of its functioning does not reach any K limit cycles when B samples from the number of M−R of the first samples of information signal have been subsequently fed to its input, the decision shall be made to deny recognition of an object.

2. A method according to claim 1, characterized in that the dynamic system is being formed for when d=1 in such a manner that in its graphic representation:

the set of all N quantization levels are identically mapped on an abscissa X and ordinate Y within the range of ($0 \leq X \leq L$), ($0 \leq Y \leq L$);

for each reference signal points are plotted so that a abscissa X of each point shall be equal to a value of the corresponding sample of said reference signal, and ordinate Y of each point shall be equal to the value of the next sample of the same reference signal;

through each "r"-th plotted point (r=1, 2, ..., N"N'≦N) shall be drawn "r"-th informative line segment, being function $f_r$ of argument X relating to the abscissa, so that for each r-th plotted point the value of the first derivative $f'_r$ of the above mentioned function $f_r$ is such that the product of all these values is equal to predetermined value;

adjacent ends of the drawn r-th and (r+1)-th segments along the abscissa being connected to each other by line and in sequence, and the beginning of the first (r=1) segment being connected by a line to the origin of the abscissa, and the end of the last (r=N) segment being connected by a line to the point L of the abscissa.

3. A method according to claim 2, characterized in that the informative segments through each r-th plotted point shall be drawn in such a manner that the product of all values of the first derivatives $f'_r$ is more that one.

4. A method according to claim 2, characterized in that the informative segments through each r plotted point shall be drawn in such a manner that the product of all values of the first derivatives $f'_r$ is less than one.

5. A method according to claim 4, characterized in that the informative line segments through each r-th plotted point shall be drawn in such a manner that the product of all values of the first derivative $f'_r$ of the function corresponding to the drawn line in the plotted point is less than one.

6. A method according to claim 2, characterized in that each connecting line with the value of the first derivative $f'_r$ at least in one point less than one shall be replaced with two lines connecting the ends of the connecting line being replaced with a projection of its predetermined point on the abscissa.

7. A method according to claim 4, characterized in that:

when the sample $I_S$ of the information signal is fed to the input of the dynamic system the value of the first derivative $f'_r$ of the function f of the corresponding informative segment shall be determined;

if the found value of the first derivative f' is more or equal to one then the next sample $I_{S+1}$ of the information signal shall be put to the input of the dynamic system, and the value of die first derivative f' shall be determined again;

if the found value of the first derivative f' is less than one then a step-by-step iteration shall be carried out comparing the result obtained by means of this iteration with the sample of the information signal next to the one that has been put to the input of the dynamic system;

in the case of a positive result of the comparison in "h" subsequent iterations (h≧1 to be defined by confidence conditions) the decision shall be made on recognition of the identified object;

in the case of positive result of the comparison in less than "h" subsequent iterations the next of M–R first samples of the information signal shall be put to the input of the dynamic system and the above mentioned operations shall be repeated.

in the case of a positive result of the comparison in less than "h" subsequent iterations when all M–R first samples of the information signal are put to the input of the dynamic system the decision shall be made to deny the recognition of the identified object.

8. A method according to claim 4, characterized that:

when the sample $I_S$ of information signal is fed to the input of the dynamic system the value of the first derivative f' of junction f of the corresponding segment shall be found;

if the found value of the first derivative f' is more than or equal to one then the next sample $I_{S+1}$ of the information signal shall be put to the input of the dynamic system, and the definition of the first derivative f' shall be repeated for it;

if the found value of the first derivative f is less than one then P step-by-step iterations shall be carried out in the dynamic system;

the sequences of P samples obtained by means of step-by-step iterations, starting from the sample that started up P step by step iterations, shall be compared to the sequence of P+1 of samples of the information signal;

in the case both said sequences coincide with the degree of similarity not less than the predetermined one the decision shall be made of the identified object;

in the case both said sequences coincide with the degree of similarity less than the predetermined one the next of the subsequent M–R samples of the first samples of the information signal shall be put to the input of the dynamic system, and said P step-by-step iterations and the comparison of the sequences shall be carried out;

in the case of a negative result of the comparison of said sequences when all of M–R first samples of the information signal are fed to the input of the dynamic system the decision shall be made to deny the recognition of the identified object.

9. A method according to claim 3, characterized in that in the process of the functioning of the dynamic system:

after the feeding of the first sample of the information signal to the input of dynamic system all other its samples shall be fed;

in the case when at least part of samples of the information signal defined by the confidence conditions reaches segment on the abscissa that are defined by the projections of informative line segments, the dynamic system shall be modified by changing these informative line segments in such a manner that the values of first derivatives of $f'_r$ corresponding to the segments of function $f_r$ shall be less than one;

step-by-step iterations shall be carried out in the modified dynamic system with predetermined initial conditions;

in the case the phase trajectory of the modified dynamic system reaches one of the K limit cycles the decision shall be made on recognition of the identified object;

in the case samples of the information signal do not reach the segments of the abscissa corresponding to projections of informative line segments or if the phase trajectory in the course of iteration of the modified dynamic system does not reaches any of the K limit cycles the decision shall be made to deny the recognition.

10. A method according to claim 1, characterized in that during the selection of the number N of quantization levels:

"n" certain quantization levels in the range L shall be mapped to "n" various initial features for all the set of K reference objects;

if at least in one reference object at least one initial feature is repeated then each j-th quantization level (j=1, 2, . . . , n) shall be changed for "n" sub-levels of quantization in the range between the (j−1) and (j+1) quantization levels, so that each sub-level of quantization designated as (j, l)-th level (where l=1, 2, . . . , n) shall correspond to a couple of the subsequent initial features following each other.

11. A. The method according to claim 10, characterized in that said quantization levels shall be carried out q times (q≧1) while at least in one reference object a combination of q+1 initial features is repeated.

12. A method according to claim 10, characterized in that after "q" fold replacement of quantization levels have been made their number shall be added with additional quantization levels, each corresponding to one repeated combination of q+1 initial features.

13. A method according to claim 11, characterized in that:

in the case the number of reference objects is increased the representation of each new reference object shall be transformed into a corresponding reference signal similar to the representations of K initial reference objects;

if neither level of this new reference signal is equal to any level in K initial reference signal, and all levels of the new reference signals are within the range L, then number N of quantization levels shall be kept constant;

if at least one level of the new reference signal is equal to any level in one of K initial reference signals, or one level of the new reference signal is not within the range L, then number of quantization levels shall be increased correspondingly.

* * * * *